Figure 1:
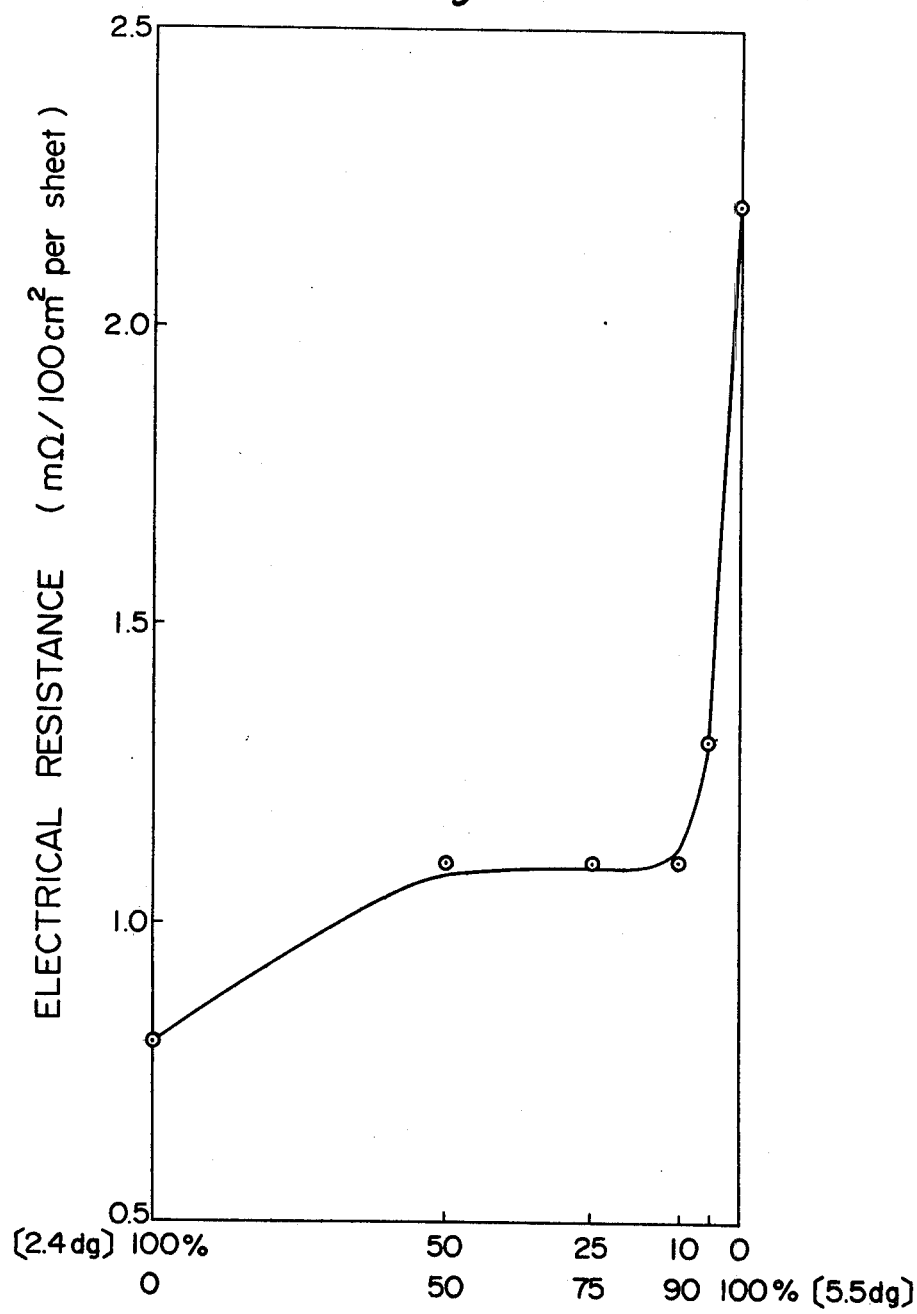

United States Patent [19]

Miura et al.

[11] 4,205,122
[45] May 27, 1980

[54] BATTERY SEPARATOR AND METHOD FOR BATTERY SEPARATION

[75] Inventors: Yoshikazu Miura, Ichihara; Yoshifumi Ichikura, Ageo, both of Japan

[73] Assignee: Mitsui Petrochemical Industries, Ltd., Tokyo, Japan

[21] Appl. No.: 945,293

[22] Filed: Sep. 25, 1978

[30] Foreign Application Priority Data

Apr. 26, 1978 [JP] Japan .................. 53-48747

[51] Int. Cl.$^2$ .................. H01M 2/16
[52] U.S. Cl. .................. 429/144; 29/623.1; 429/252; 429/254
[58] Field of Search .................. 429/144, 145, 254, 253, 429/252, 249, 247; 29/623.1

[56] References Cited

U.S. PATENT DOCUMENTS

| | | | |
|---|---|---|---|
| 2,482,062 | 9/1949 | Hanson | 429/254 |
| 2,734,095 | 2/1956 | Mears et al. | 429/252 |
| 3,085,126 | 4/1963 | Labino | 429/247 |
| 3,811,957 | 5/1974 | Buntin | 429/143 |
| 4,007,059 | 2/1977 | Witherspoon et al. | 429/251 |
| 4,137,377 | 1/1979 | McClelland | 429/145 |

FOREIGN PATENT DOCUMENTS

7509458 10/1974 Netherlands .................. 429/254

*Primary Examiner*—Donald L. Walton
*Attorney, Agent, or Firm*—Sherman & Shalloway

[57] ABSTRACT

A battery separator of reduced electric resistance comprising a self-supporting non-woven mat consisting essentially of a mixture of (A) olefinic resin fibers having a coarseness of from 4 to 13 decigrex, (B) olefinic resin fibers having a coarseness of less than 4 decigrex in an amount of not less than 3 parts by weight per 100 parts by weight of fibers (A) and (C) inert filter materials in an amount of 0 to about 600 parts by weight per 100 parts by weight in total fibers (A) and (B). The battery separator is produced by subjecting an aqueous dispersion of said mixture to a sheet-forming operation; drying the resulting wet non-woven mat; and heat-treating the dried mat at a temperature ranging from a point 20° C. lower than the melting point of the fibers (A) and (B) to a point about 50° C. higher than the melting point.

16 Claims, 1 Drawing Figure

BATTERY SEPARATOR AND METHOD FOR BATTERY SEPARATION

This invention relates to an inexpensive battery separator having low electrical resistance and an improved ability to inhibit the passage of active materials; a method for its production; and to a method for separating adjacent electrodes in a battery using said separator.

Specifically, the battery separator of the invention comprises a self-supporting non-woven mat consisting essentially of a mixture of (A) olefinic resin fibers having a coarseness of from 4 to 14 decigrex, (B) olefinic resin fibers having a coarseness of less than 4 decigrex in an amount of not less than 3 parts by weight per 100 parts by weight of fibers (A), and (C) inert filler materials in an amount of 0 to about 600 parts by weight per 100 parts by weight in total of fibers (A) and (B).

According to the widespread practice, a mat composed of a microporous material which is inert, and has resistance, to electrolytes is positioned between adjacent electrodes in a battery, especially a storage battery, so as to prevent short-circuiting of the electrodes and the migration of a fine active material formed at one electrode to the other. Battery separators of this kind, for example a separator for a lead storage battery, are required to withstand long-term use in an acidic atmosphere or in the presence of a sulfate ion, a lead ion or the like; to have a microporous structure for inhibiting the passage of fine active materials; and to have a low electric resistance that permits free passage of various ions such as a proton, a sulfate ion or a lead ion.

In recent years, fibers of olefinic resins such as olefin polymers and copolymers have come into use as a fibrous component of separators because of their superior chemical resistance and low cost.

The ability of a battery separator to inhibit passage of fine active materials increase with decreasing pore diameter of the separator. Decreasing pore diameters, however, render the passage of ions difficult, and disadvantageously increase the electrical resistance of the separator. To balance these two properties has always been a difficult problem.

In an attempt to solve this problem, the utilization of fine-denier olefinic resin fibers was suggested (for example, U.S. Pat. Nos. 2,482,062 and 3,811,957). The experiments of the present inventors have shown that by using fibers of an olefinic resin such as a polyolefin having a diameter of less than about $7\mu$, a battery separator having a low electric resistance and the ability to block the passage of active materials can be provided.

It is difficult and costly, however, to produce olefinic resin fibers of small diameters by a so-called melt-blowing process. According to this method, filament breakage occurs frequently, and the operation cannot be performed stably. Consequently, the cost of production increases, and battery separators made of such fibers are naturally of high cost.

Fibers having a considerably small diameter can also be obtained by flashing a solution of a polyolefin in a solvent, but to produce fibers having a diameter of less than about $7\mu$, the concentration of the polyolefin should be maintained considerably low. Consequently, the output per unit time considerably decreases, and the cost of producing polyolefin fibers of the desired diameter is also high.

Certainly, reduced electrical resistance and improved ability to inhibit passage of active materials can be obtained by making a battery separator from olefinic resin fibers having a diameter of less than about $7\mu$, but according to the prior techniques, this always involves disadvantages in operation and cost.

The present inventors made investigations in order to provide an inexpensive battery separator having reduced electrical resistance and improved ability to inhibit passage of active materials without causing such disadvantages.

It has now been found unexpectedly that the use of a mixture consisting of a major proportion of inexpensive olefinic resin fibers and a minor proportion of fine olefinic resin fibers can afford a battery separator having a low electric resistance and the ability to inhibit passage of active materials which are comparable to these properties of battery separators composed only of the fine olefinic resin fibers. It has specifically been found that these improved properties can be obtained by the use of a self-supporting non-woven mat composed of (A) olefinic resin fibers having a coarseness of from 4 to 13 decigrex, (B) olefinic resin fibers having a coarseness of less than 4 decigrex in an amount of not less than about 3 parts by weight per 100 parts by weight of fibers (A), and (C) as an optional ingredient, inert filler materials.

Unexpectedly and surprisingly, the inventors discovered that the addition of small amounts of fibers (B) to fibers (A) causes a striking decrease in the electrical resistance of the resulting mat. This can, for example, be seen from the attached FIG. 1 which is a graph showing the electrical resistances of battery separators composed of a mixture in various proportions of polyethylene fibers having a coarseness of 5.5 dg and polyethylene fibers having a coarseness of 2.4 dg. It is seen from FIG. 1 that when a small amount, for example about 5 to 10%, of the fibers having a coarseness of 2.4 dg is mixed with the fibers having a coarseness of 5.5 dg, the electrical resistance of the battery separator decreases markedly as compared with the case where the separator consists only of the fibers having a coarseness of 5.5 dg, and thus greatly approaches the electrical resistance of a separator composed only of the expensive fibers having a coarseness of 2.4 dg. In addition to such a surprising reduction in electrical resistance, the ability to inhibit passage of active materials has also been found to be satisfactory.

It is an object of this invention therefore to provide a battery separator composed of olefinic resin fibers which is inexpensive and has improved ability to inhibit the passage of active materials and reduced electrical resistance.

Another object of this invention is to provide a method which can afford such a battery separator with commercial advantage.

Still another object of this invention is to provide a method for separating adjacent electrodes in a battery using such a battery separator.

The above and other objects and advantages of this invention will become more apparent from the following description.

The fiber mixture used to produce the battery separator of the invention comprises (A) olefinic resin fibers having a coarseness of from 4 to 13 decigrex, preferably from 4.5 to 13 decigrex, and (B) olefinic resin fibers having a coarseness of less than 4 decigrex, preferably less than 4 decigrex to 1 decigrex.

The "coarseness", as used herein, is measured in accordance with the method T234 SU-67 of TAPPI (Technical Association of the Pulp and Paper Industry), U.S.A. The unit decigrex expresses the weight of fibers in milligrams per 100 m of the fibers.

The lengths of the fibers (A) and (B) can be varied widely. Preferably, they have an average fiber length of about 0.5 to about 3 mm, more preferably about 0.7 to about 2.5 mm.

These fibers (A) and (B) have a pulp freeness (Canadian standard), measured by TAPPI T227 OS-58, of preferably about 150 to about 750 ml, more preferably about 200 to about 700 ml.

The proportions of these fibers are not less than about 3 parts by weight of fibers (B) per 100 parts by weight of fibers (A) The amount of the fibers (B) is preferably at least 5 parts by weight, more preferably at least about 10 parts by weight, on the same basis. Usually, amounts of less than about 70 parts by weight per 100 parts by weight of fibers (A) are sufficient. If the amount of the fibers (B) is less than about 2 parts by weight, the effect of reducing electrical resistance is very small as can also be understood from FIG. 1.

The resins which make up the olefinic resin fibers (A) and (B) are conveniently selected from olefin polymers or copolymers or blends of these. Examples include high-density and low-density polyethylenes composed mainly of ethylene units, crystalline polypropylene composed mainly of propylene units, crystalline polybutene-1 composed mainly of butene-1 units, crystalline poly(4-methylpentene-1) composed mainly of 4-methylpentene-1 units, and mixtures of at least two of these. Among them, high density polyethylenes having a density of 0.94 to 0.97 (g/ml) and a melt index (190° C.) of 0.1 to 30 and crystalline polypropylene having a melt index (230° C.) of 0.1 to 30 are preferred.

The olefinic resin fibers (A) are produced by various methods such as a melt-spinning method; a method comprising splitting filaments or films; a melt-blowing method disclosed, for example, in U.S. Pat. No. 3,811,957, and a flash spinning method which comprises flashing a solution of an olefinic resin in a solvent such as an aliphatic or aromatic hydrocarbon, or an emulsion consisting of the olefinic resin and water containing a surfactant such as carboxymethyl cellulose, starch or polyvinyl alcohol. Fibers prepared by the flash spinning method are preferred.

The olefinic resin fibers (B) can be produced by the aforesaid melt-blowing method or the flash spinning method, but those prepared by the flash method are preferred. The fibers (B) are very fine as shown by their coarseness of less than 4 decigrex, and the cost of production is high. This is because in the melt-blowing method, filament breakage occurs and the operation becomes unstable, and in the flash method, the concentration of the polyolefin in the solution must be decreased and consequently the output of the fibers per unit time is low. However, because the amount of fibers (B) is minor, the cost of the resulting battery separator can be much reduced.

The battery separator of the invention can be produced by a wet process or a dry process by utilizing known techniques which can afford a self-supporting non-woven mat from the fibers (A) and (B). For example, it can be produced by a wet process which comprises subjecting an aqueous dispersion of a mixture composed of (A) olefinic resin fibers having a coarseness of from 4 to 13 decigrex, (B) olefinic resin fibers having a coarseness of less than 4 decigrex in an amount of not less than about 3 parts by weight per 100 parts by weight of fibers (A), and (C) inert filler materials in an amount of 0 to about 600 parts by weight per 100 parts by weight in total of fibers (A) and (B) to a sheet-forming operation to form a wet non-woven mat, drying the wet mat, and heat-treating the resulting non-woven mat at a temperature ranging from a point 20° C. lower than melting point of the fibers (A) and (B) (the melting point of the one having a lower melting point when the fibers (A) and (B) are of different olefinic resins) to a point about 50° C. higher than the melting point, preferably from the melting point of the fibers (A) and (B) to a point about 40° C. higher than the melting point, more preferably from the melting point to a point about 20° C. higher than the melting point, thereby to form a self-supporting non-woven mat.

The aqueous dispersion of the fiber mixture can be formed by optionally adding the inert filler materials (C) to the olefinic resin fibers (A) and (B), and processing the mixture by means well known in the paper-making technology such as a beater or pulper. The resulting aqueous dispersion or slurry of the fiber mixture can be subjected to the same sheet-forming operation as in conventional paper-making processes to form a non-woven mat. The suitable total amount of the fibers (A) and (B) and the filler materials (C) is preferably about 0.01 to about 3% by weight, more preferably about 0.01 to about 1% by weight, based on the weight of water.

A surface active agent may be added to the aqueous dispersion in order to impart hydrophilicity to the olefinic resin fibers. Instead of, or besides, the addition of the surfactant to aqueous dispersion before sheet-formation, it may be added to the resulting mat by a spraying means at any time after sheet formation but before heat treatment. The amount of the surface active agent used is, for example, about 0.05 to about 1% by weight, based on the total weight of the olefinic fibers (A) and (B) and the inert filler materials (C). Preferred surfactants are, for example, anionic surfactants such as alkali salts of higher fatty acids, alkylsulfonic acid salts, alkylaryl sulfonate salts, and sulfosuccinate ester salts.

The resulting wet non-woven mat is dried by a suitable means, and then heat-treated at the above-specified temperatures to form a self-supporting non-woven mat. The drying and heat treatment of the non-woven mat can be performed by passing it through a hot air dryer or by means of dryers used in conventional paper-making machines, such as a Yankee dryer. As a result of the heat treatment, the olefinic resin fibers in the mat slightly melt at least at the surface portion of the entire sheet (i.e., over the entire breadth and thickness), and adhere to one another and to the filler materials thereby to afford a self-supporting non-woven mat. The resulting self-supporting non-woven mat is such that when it is immersed in an electrolytic solution of a battery, for example an aqueous solution of sulfuric acid or an alkaline aqueous solution, the olefinic resin fibers and the filler materials do not come off from the mat. This heat treatment also serves to control the liquid permeability of the resulting mat and its pore size.

The heat treatment can be effected by any desired means. Preferably, it is performed by passing the non-woven dry mat through a hot air such as hot air oven so as to impart a uniform heating effect to the whole of the mat. Other heating means which can impart such a heating effect can of course be used. Pressurizing means may also be used at this stage. Preferably, the heat-treated mat is calendered by calender rolls, preferably chilled rolls to increase the surface smoothness of the resultant self-supporting non-woven mat.

The battery separator of the invention can also be formed by a dry process which can be performed, for example, by a known "air-blow" method which comprises carrying the mixture of the olefinic resin fibers (A) and (B) and the filler materials (C) by a carrier gas such as air and depositing it on a wire gauze, for example. The non-woven dry mat so deposited is heat-treated in the same manner as in the wet process to form the desired self-supporting non-woven mat.

The term "inert" in the inert filler materials (C) means that the filler materials do not dissolve in an electrolytic solution of a battery and thus do not adversely affect the performance of the battery. The inert filler materials (C) used in this invention are any filler materials which have resistance to electrolyte solutions of battery and do not melt upon heat-treatment to an extent of substantially losing their shape. Incorporation of such filler materials serves to further reduce the cost of the battery separator and to reinforce the separator.

Examples of the inert filler materials (C) are cellulosic pulps of natural sources such as wood pulp, linter pulp and kraft pulp; regenerated cellulose fibers such as rayon fibers and acetate fibers; synthetic fibers other than olefinic resin fibers, such as polyvinyl alcohol fibers, polyester fibers, polyamide fibers and acrylic fibers; inorganic fibrous materials such as glass fibers, rock fibers and asbestos fibers; inorganic filler materials such as diatomaceous earth, silica, white carbon and gypsum; and mixtures of at least two of these.

The suitable amount of the filler materials (C) is up to about 600 parts by weight, preferably about 10 to about 500 parts by weight, more preferably about 15 to about 350 parts by weight, per 100 parts by weight in total of the fibers (A) and (B).

In other words, the total weight of the fibers (A) and (B) accounts for at least about 15% by weight of the non-woven self-supporting mat that makes up the battery separator of the invention.

The preferred thickness of the self-supporting non-woven mat is about 0.1 to about 2 mm.

In one preferred embodiment of the battery separator of the invention, a glass fiber mat is laminated to at least one surface of the self-supporting non-woven mat. The glass fiber mat in the laminate serves to increase the service life of the electrode plates, improve their vibration resistance and protect the separator. In this preferred embodiment, a hydrogen gas which is generated at the electrode of the battery can easily escape out of the battery system, and the electric insulation of the battery is increased.

The use of macroporous glass fiber mats which are ordinarily used is preferred. Preferably, the arrangement of the glass fiber mat is such that the glass filaments are positioned in a direction obliquely crossing the upward direction of a battery separator disposed between adjacent electrodes in which bubbles of a hydrogen gas escape out of the battery system, and these glass filaments are intertwined with one another to form a network configuration as a whole.

The glass fiber mat can be produced by aligning glass filaments in sheet form so that the individual filaments cross one another and after spreading, the aforesaid network configuration may be formed, spreading the mass, superposing two or more of the developed thin sheets, and bonding the crossing portions by a suitable means such as spraying or dipping using a known bonding agent such as acrylic resin emulsion-type bonding agent or a phenolic resin bonding agent.

Preferably, the glass fibers have a diameter of about 10 to about 30 microns, and a thickness of about 0.1 to about 2.0 mm. The apparent density of the glass fiber mat is preferably about 0.1 to about 0.3 g/cm$^3$.

In the laminate of the self-supporting non-woven mat composed of the olefinic resin fibers (A) and (B) and the filler material (C) as an optional component and the glass fiber mat, the two mats need not to be integrated throughout the entire laminate. Preferably, lamination is effected so that the overlaid mats will be bonded at least partly to permit easier escape of hydrogen gas bubbles out of the battery system. For example, it is preferred that the two mats are bonded at only both side edge portions of the laminate which face two adjacent electrodes when the laminate separator is disposed between them; or the two mats are bonded in spots at spaced-apart points.

An acrylic resin emulsion bonding agent can be suitably used to form this laminate. Other bonding agents which can withstand electrolyte solutions of batteries can of course be used.

According to this invention, there is provided a method of separating electrodes of a battery which comprises positioning the battery separator described hereinabove between adjacent electrodes of the battery.

The battery separator of the invention may be formed in a configuration that permits easy escape of hydrogen gas bubbles out of the battery system. For example, its sectional shape in the direction of both ends is wavy or serrate; or is corrugate to form a vertical through passageway. Or a similar vertical through passage may be formed by providing two or more linear ribs of olefinic resin vertically at spaced-apart points.

The separator of this invention has an electrical resistance of as low as about 0.8 to 1.5 mΩ/100 cm$^2$ per sheet, and can effectively inhibit the migration of active materials. Accordingly, it functions as an excellent separator for batteries, especially lead storage batteries.

The process of the invention described hereinabove has made it possible to produce separators of excellent performance at low cost, and its industrial value is great.

The following examples illustrate the present invention.

PRODUCTION OF FIBERS

Olefinic resin fibers A and B used in the following examples were prepared by flashing a solution of polyethylene or polypropylene in hexane. The properties of the fibers are shown in Table 1.

Table 1

|  | Olefinic resin fibers A | | | Olefinic resin fibers B | |
| --- | --- | --- | --- | --- | --- |
|  | $A_1$ | $A_2$ | $A_3$ | $B_1$ | $B_2$ |
| C (*1) (dg) | 8.6 | 5.5 | 6.3 | 2.5 | 1.9 |
| l (*2) (mm) | 1.2 | 1.3 | 2.1 | 1.0 | 1.2 |
| CSF(*3) (ml) | 700 | 350 | 680 | 400 | 530 |
| Type of olefinic resin | Polyethylene | Polyethylene | Polypropylene | Polyethylene | Polypropylene |
| Density (g/cm$^3$) | 0.968 | 0.968 | 0.910 | 0.968 | 0.910 |

Table 1-continued

| | Olefinic resin fibers A | | | Olefinic resin fibers B | |
|---|---|---|---|---|---|
| | $A_1$ | $A_2$ | $A_3$ | $B_1$ | $B_2$ |
| Melt index | 5.4 | 1.8 | 7.3 | 2.7 | 4.7 |

(*1):Coarseness (dg: decigrex; unit mg/100 m)
(*2):Average fiber length measured by the method described in TAPPI T232 SU-68
(*3):Freeness (Canadian standard) measured by the method described in TAPPI T227 OS-58

COMPARATIVE EXAMPLES 1 AND 2

A hand sheet having a basis weight of 120 g/m² was prepared from each of olefinic resin fibers $B_1$ and $B_2$ in accordance with TAPPI T205 m-58. The electrical resistances of the hand sheets were measured in accordance with JIS C2313, and found to be 1.1 mΩ/100 cm² per sheet and 1.0 mΩ/100 cm² per sheet, respectively.

EXAMPLES 1 TO 3

Hand sheets were prepared in the same way as in Comparative Example 1 except that a mixture of 100 parts by weight of olefinic resin fibers $A_1$ and 5, 10 or 100 parts by weight of olfinic resin fibers $B_1$ was used. The results are shown in Table 2.

EXAMPLE 4

The procedure of Comparative Example 1 was repeated using a mixture of 100 parts by weight of olefinic resin fibers $A_2$ and 10 parts of olefinic resin fibers $B_1$. The results are shown in Table 2.

EXAMPLE 5

Example 1 was repeated except that a mixture of 100 parts by weight of olefinic resin fibers $A_3$ and 10 parts by weight of olefinic resin fibers $B_2$ was used instead of the mixed fibers in Example 1. The results are shown in Table 2.

COMPARATIVE EXAMPLES 3 to 5

Comparative Example 1 was repeated except that olefinic resin fibers $A_1$, olefinic resin fibers $A_2$ and olefinic resin fibers $A_3$ were used singly instead of the olefinic resin fibers $B_1$. The results are shown in Table 2.

except that instead of the olefinic resin fibers $B_1$, there was used a mixture of 100 parts by weight of the olefinic resin fibers $A_1$, 35 parts by weight of olefinic resin fibers $B_1$, and 100 parts by weight, based on 100 parts by weight in total of the fiber mixture, of silica having an average particle diameter of 0.022μ as an inorganic filler material.

The sheet was completely dried in a hot air dryer at 60° C., heated in a hot air drier at 140° C. for 20 seconds, and immediately then, calendered with chilled rolls under pressure to form a filler-incorporated separator having a density of 0.336 g/cm³. A glass mat having a thickness of 1 mm and a density of 0.16 g/cm³ was laminated to the resulting separator. These mats were bonded with a phenolic resin bonding agent so that they would be bonded at only those side edge portions which would face two adjacent electrodes when it is placed between them. The laminate separator had an electric resistance of 1.3 mΩ/100 cm² per sheet.

COMPARATIVE EXAMPLE 6

A hand sheet having a basis weight of 120 g/cm² was prepared in the same way as in Example 6 except that the olefinic resin fibers $B_1$ were not used, and 100 parts by weight of the silica was used per 100 parts by weight of the olefinic resin fibers $A_1$.

A glass mat was laminated to the resulting sheet in the same way as in Example 6. The laminate separator had an electric resistance of 3.6 m/100 cm² per sheet.

What we claim is:

1. A battery separator comprising a self-supporting non-woven mat consisting essentially of a mixture of
   (A) olefinic resin flash-spun fibers having a coarseness of from 4.5 to 13 decigrex,
   (B) olefinic resin flash-spun fibers having a coarseness of less than 4 decigrex to 1 decigrex in an amount of about 3 parts to about 70 parts by weight per 100 parts by weight of fibers (A) and
   (C) inert filler materials in an amount of 0 to about 600 parts by weight per 100 parts by weight in total of fibers (A) and (B).

2. The battery separator of claim 1 wherein a glass fiber mat is laminated to at least one surface of the self-supporting non-woven mat.

3. The battery separator of claim 2 wherein said glass

Table 2

| | Mixing proportions of the fibers (parts by weight) | | | | | Coarseness of mixed fibers (dg) | Electrical resistance (mΩ/100 cm². per sheet) | Maximum pore size (μ) (*) |
|---|---|---|---|---|---|---|---|---|
| | $A_1$ | $A_2$ | $A_3$ | $B_1$ | $B_2$ | | | |
| Comp. Ex. | | | | | | | | |
| 1 | — | — | — | 100 | — | 2.5 | 1.1 | 8 |
| 2 | — | — | — | — | 100 | 1.9 | 1.0 | |
| Example | | | | | | | | |
| 1 | 100 | — | — | 5 | — | 7.7 | 1.2 | 22 |
| 2 | 100 | — | — | 10 | — | 7.0 | 1.1 | 21 |
| 3 | 100 | — | — | 100 | — | 3.9 | 1.0 | 11 |
| 4 | — | 100 | — | 10 | — | 5.0 | 1.1 | |
| 5 | — | — | 100 | — | 10 | 5.2 | 1.1 | |
| Comp. Ex. | | | | | | | | |
| 3 | 100 | — | — | — | — | 8.6 | 2.4 | 24 |
| 4 | — | 100 | — | — | — | 5.5 | 2.2 | |
| 5 | — | — | 100 | — | — | 6.3 | 1.9 | |

(*)Measured by an entry capillary pressure method described in Chemical Engineering Practice, Vol. 2, pages 342-461 (published by Butterworths Scientific Publications) using a sheet having a basis weight of 60 g/m² as a sample.

EXAMPLE 6

A hand sheet having a basis weight of 120 g/m² was prepared in the same way as in Comparative Example 1 fiber mat comprises glass fibers having a diameter of about 10 to about 30 microns and said mat has a thickness of about 0.1 to about 2.0 mm.

4. The battery separator of claim 1 in which the amount of the fibers (B) is from about 10 to 70 parts per 100 parts by weight of fibers (A).

5. The battery separator of claim 1 in which the amount of (C) inert filler material is from about 10 to about 500 parts by weight per 100 parts by weight in total of fibers (A) and (B).

6. The battery separator of claim 1 wherein said self-supporting non-woven mat has a thickness of about 0.1 to about 2 mm.

7. The battery separator of claim 1 wherein the fibers of (A) and (B) have an average fiber length of about 0.5 to about 3 mm and a pulp freeness of about 150 to about 750 ml.

8. The battery separator of claim 1 wherein the fibers of (A) and (B) have an average fiber length of about 0.7 to about 2.5 mm and a pulp freeness of about 200 to about 700 ml respectively.

9. A method for separating electrodes in a battery, which comprises positioning between two adjacent electrodes a self-supporting non-woven mat consisting essentially of
(A) olefinic resin flash-spun fibers having a coarseness of from 4.5 to 13 decigrex,
(B) olefinic resin flash-spun fibers having a coarseness of less than 4 decigrex to 1 decigrex in an amount of from about 3 parts to about 70 parts by weight per 100 parts by weight of fibers (A), and
(C) inert filler materials in an amount of 0 to about 600 parts by weight per 100 parts by weight in total of fibers (A) and (B).

10. The method of claim 9 wherein the self-supporting non-woven mat has a glass fiber mat laminated to at least one surface thereof.

11. The method according to claim 10 wherein said glass fiber mat comprises glass fibers having a diameter of about 10 to about 30 microns and said mat has a thickness of about 0.1 to about 2.0 mm.

12. The method according to claim 9 in which the amount of the fibers (B) is from about 10 to 70 parts per 100 parts by weight of fibers (A).

13. The method according to claim 9 in which the amount of (C) inert filler material is from about 10 to about 500 parts by weight per 100 parts by weight in total of fibers (A) and (B).

14. The method according to claim 9 wherein said self-supporting non-woven mat has a thickness of about 0.1 to about 2 mm.

15. The method according to claim 9 wherein the fibers of (A) and (B) have an average fiber length of about 0.5 to about 3 mm and a pulp freeness of about 150 to about 750 ml.

16. The method according to claim 9 wherein the fibers of (A) and (B) have an average fiber length of about 0.7 to about 2.5 mm and a pulp freeness of about 200 to about 700 ml respectively.

* * * * *